US012607876B2

(12) United States Patent
Bradley et al.

(10) Patent No.: US 12,607,876 B2
(45) Date of Patent: Apr. 21, 2026

(54) CONTACT LENSES AND METHODS RELATING THERETO

(71) Applicant: CooperVision International Limited, Fareham (GB)

(72) Inventors: Arthur Bradley, Bloomington, IN (US); Baskar Arumugam, Dublin, CA (US); Paul Chamberlain, Livermore, CA (US); Martin Webber, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 334 days.

(21) Appl. No.: 18/210,090

(22) Filed: Jun. 15, 2023

(65) Prior Publication Data

US 2023/0408845 A1 Dec. 21, 2023

Related U.S. Application Data

(60) Provisional application No. 63/354,120, filed on Jun. 21, 2022.

(51) Int. Cl.
*G02C 7/04* (2006.01)
*G02C 7/02* (2006.01)

(52) U.S. Cl.
CPC ............. *G02C 7/041* (2013.01); *G02C 7/022* (2013.01); *G02C 7/044* (2013.01); *G02C 2202/24* (2013.01)

(58) Field of Classification Search
CPC ........ G02C 7/041; G02C 7/022; G02C 7/044; G02C 7/024; G02C 2202/24; G02C 2202/12; B29D 11/00038
See application file for complete search history.

(56) References Cited

U.S. PATENT DOCUMENTS

| | | | |
|---|---|---|---|
| 8,684,520 B2 * | 4/2014 | Lindacher | .............. G02C 7/028 |
| | | | 351/159.52 |
| 12,372,810 B2 * | 7/2025 | Curatolo | ................ G02C 7/028 |

(Continued)

FOREIGN PATENT DOCUMENTS

| | | |
|---|---|---|
| CN | 1794040 A | 6/2006 |
| EP | 3290994 A1 | 3/2018 |

(Continued)

OTHER PUBLICATIONS

Search and Examination Report issued in corresponding United Kingdom Patent Application No. GB2308940.2 dated Dec. 14, 2023 (5 pages).

(Continued)

*Primary Examiner* — Ricky L Mack
(74) *Attorney, Agent, or Firm* — Kilyk & Bowersox, P.L.L.C.

(57) ABSTRACT

A contact lens (101), the lens (101) including an optic zone (102). The optic zone (102) comprises a central region (105), the central region (105) having a centre of curvature that is on an optical axis (119). The optic zone (102) comprises a first annular region (103). The first annular region (103) has an off-axis centre of curvature that is a first distance from the optical axis (119). The first annular region (103) has a sagittal power profile that increases with increasing radial distance from the optical axis (119) with a gradient of between 1.0 D/mm and 20.0 D/mm. At a point halfway across the width of the first annular region (103), the sagittal power matches the average radial sagittal power of the central region (105).

20 Claims, 10 Drawing Sheets

(56)        References Cited

U.S. PATENT DOCUMENTS

| | | | | |
|---|---|---|---|---|
| 12,416,819 | B2 * | 9/2025 | Gacoin | G02B 3/0031 |
| 2004/0201821 | A1 * | 10/2004 | Tyson | G02C 7/042 |
| | | | | 351/159.41 |
| 2005/0068494 | A1 * | 3/2005 | Griffin | G02C 7/044 |
| | | | | 351/159.41 |
| 2007/0296916 | A1 * | 12/2007 | Holden | G02C 7/044 |
| | | | | 351/159.48 |
| 2010/0321632 | A1 | 12/2010 | Sanger | |
| 2011/0187993 | A1 * | 8/2011 | Alonso | G02C 7/065 |
| | | | | 351/159.42 |
| 2013/0201454 | A1 | 8/2013 | Back | |
| 2015/0316788 | A1 * | 11/2015 | Holden | A61F 2/06 |
| | | | | 351/159.42 |
| 2016/0161763 | A1 | 6/2016 | Goto et al. | |
| 2019/0227342 | A1 | 7/2019 | Brennan et al. | |
| 2020/0409178 | A1 | 12/2020 | Zhao | |
| 2021/0041721 | A1 | 2/2021 | Nguyen et al. | |
| 2021/0341755 | A1 | 11/2021 | Webber | |
| 2023/0102797 | A1 | 3/2023 | Bakaraju et al. | |
| 2023/0229021 | A1 | 7/2023 | Tung | |

FOREIGN PATENT DOCUMENTS

| | | | |
|---|---|---|---|
| GB | 2604022 | A | 8/2022 |
| GB | 2615863 | A | 8/2023 |
| GB | 2616709 | A | 9/2023 |
| TW | 202135747 | A | 10/2021 |
| TW | 202210911 | A | 3/2022 |
| WO | 2014128744 | A | 8/2014 |

OTHER PUBLICATIONS

International Search Report and Written Opinion issued in corresponding International Patent Application No. PCT/GB2023/051566 mailed Sep. 22, 2023 (29 pages).
Examination Report issued in corresponding United Kingdom Patent Application No. GB2308940.2 dated Jul. 11, 2024 (5 pages).
Office Action issued in corresponding Taiwan Patent Application No. 113144825 dated Jan. 7, 2025 (9 pages).
Office Action issued in corresponding Taiwan Patent Application No. 112123064 mailed Feb. 26, 2024 (9 pages).

* cited by examiner

CONTACT LENSES AND METHODS RELATING THERETO

This application claims the benefit under 35 U.S.C. § 119(e) of prior U.S. Provisional Patent Application No. 63/354,120, filed Jun. 21, 2022, which is incorporated in its entirety by reference herein.

The present invention relates to contact lenses. The present invention relates especially, but not exclusively, to contact lenses for slowing the progression of myopia. The present invention also relates especially, but not exclusively, to contact lenses for use by presbyopes. The present invention also relates to methods of manufacturing such lenses.

BACKGROUND

Many people, including children and adults require contact lenses to correct for myopia (short-sightedness) and many adults may require lenses to correct for presbyopia (an age-related inability to accommodate and hence inability to focus on near objects).

Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

Presbyopic eyes do not change shape effectively to accommodate for near objects, and therefore people with presbyopia cannot focus on near objects. Conventional lenses (e.g., spectacle lenses and contact lenses) for correcting presbyopia include bifocal or progressive lenses, which include regions that are optimised for near vision and regions that are optimised for distance vision. Presbyopia may also be treated using bifocal or multifocal lenses, or monovision lenses (wherein different prescription are provided for each eye, one eye being provided with a distance vision lens, and one eye being provided with a near vision lens).

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach to correct for myopia is to provide lenses having both one or more regions that provide full correction of distance vision and one or more regions that under-correct, or deliberately induce, myopic defocus. It has been suggested that this approach can prevent or slow down the development or progression of myopia in children or young people, whilst providing good distance vision.

In the case of lenses having regions that provide defocus, the regions that provide full-correction of distance vision are usually referred to as base power regions and the regions that provide under-correction or deliberately induce myopic defocus are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

For treating myopia, it is recognised that it may be beneficial to provide a lens that introduces additional myopic defocus. For treating presbyopia, it may be beneficial to provide a lens that gives rise to an extended depth of focus.

The present disclosure provides improved lenses for use in young subjects that prevent or slow worsening of myopia.

SUMMARY

The present disclosure provides, according to a first aspect, a contact lens. The lens includes an optic zone. The optic zone comprises a central region, the central region having a centre of curvature that is on a first optical axis. The optic zone comprises a first annular region, the first annular region having an off-axis centre of curvature that is a first distance from the optical axis. The first annular region has a sagittal power profile that increases with increasing radial distance from the optical axis, with a gradient of between about 1.0 Dioptres (D)/mm and about 20.0 D/mm. At a point halfway across the radial width of the first annular region, the radial sagittal power equals the average radial sagittal power of the central region.

The present disclosure provides, according to a second aspect, a method of manufacturing a contact lens according to the first aspect. The method comprises forming a contact lens, wherein the lens comprises a central region, the central region having a base power, and a first annular region, wherein the first annular region has an off-axis centre of curvature that is a first distance from the optical axis. The first annular region has a sagittal power profile that increases with increasing radial distance from the optical axis with a gradient of between about 1.0 D/mm and about 20.0 D/mm. At a point halfway across the radial width of the first annular region, the radial sagittal power equals the average radial sagittal power of the central region.

The present disclosure provides, according to a third aspect, a method of reducing progression of myopia. The method comprises providing a contact lens according to the first aspect to a myopic person who is able to accommodate for varying near distances.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE DRAWINGS

Example embodiments will now be described, by way of example only, with reference to the accompanying schematic drawings.

DETAILED DESCRIPTION

Figures 1A, 1B:
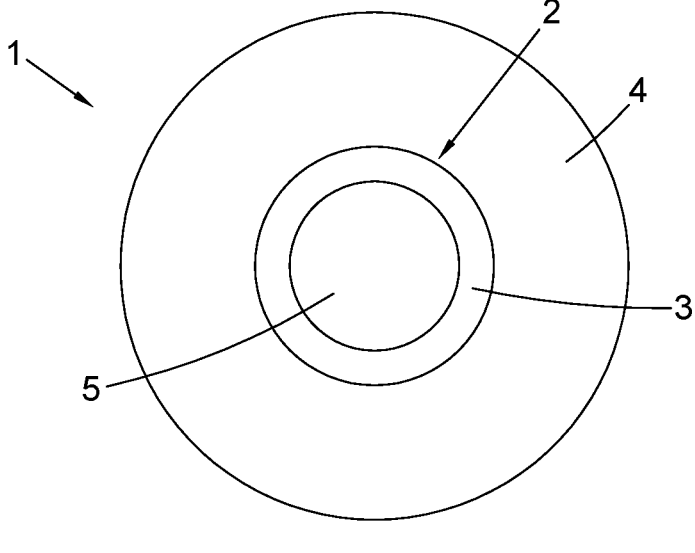
FIG. 1A is a top view of a prior art contact lens for use in the prevention of myopia.
FIG. 1B is a side view of the contact lens of FIG. 1A.

According to a first aspect, the present disclosure provides a contact lens. The contact lens includes an optic zone. The optic zone comprises a central region, the central region having a centre of curvature that is on an optical axis. The optic zone comprises a first annular region, the first annular region having an off-axis centre of curvature that is a first distance from the optical axis. The first annular region has a sagittal power profile that increases with increasing radial distance from the optical axis, with a gradient of between about 1.0 D/mm and about 20.0 D/mm, and, at a point halfway across the radial width of the first annular region, the radial sagittal power equals the average radial sagittal power of the central region.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens.

A contact lens according to the present disclosure comprises an optic zone. The optic zone encompasses parts of the lens that have optical functionality. The optic zone is configured to be positioned over the pupil of an eye when in use. For contact lenses according to the present disclosure, the optic zone comprises the central region, and the first annular region that surrounds the central region. The optic zone is surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to an embodiment of the disclosure may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye.

The contact lens may be substantially circular in shape and have a diameter from about 4 mm to about 20 mm. The optic zone may be substantially circular in shape and may have a diameter from about 2 mm to about 10 mm. In some embodiments, the contact lens has a diameter from 13 mm to 15 mm, and the optic zone has a diameter from 7 mm to 9 mm.

The optical axis may lie along the centreline of the lens. The central region may focus light from a distant point object, on the optical axis, to a spot on the optical axis at a distal focal surface. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina. Therefore the eye does not focus light onto a flat mathematical plane. However, in the art, the curved surface of the retina is commonly referred to as a plane.

The central region may be substantially circular in shape and may have diameter of between about 2 and 9 mm, preferably between about 2.5 and 4 mm. The central region may be substantially elliptical in shape. The first annular region may extend radially outwards from a perimeter of the central region by between about 0.1 to 4 mm, preferably between about 0.5 to 1.5 mm. The radial width of the first annular region may therefore be about 0.1 mm to about 4 mm, and preferably may be about 0.5 mm to about 1.5 mm. The perimeter of the central region may define a boundary between the central region and the first annular region, and the first annular region may therefore be adjacent to the central region.

The first annular region may abut the central region. A blending region may be provided between the central region and the annular region. The blending region should not substantially affect the optics provided by the central region and the annular region, and the blending region may have a radial width of 0.05 mm or less, although it may also be as wide as 0.2 mm, or as wide as 0.5 mm in some embodiments.

Light rays from a distant point source that pass through the first annular region may be focused away from the optical axis on an add power focal surface. Light rays that pass through the central region will form an on-axis blur circle at the add power focal surface. Light rays from a distant point source that pass through the first annular region may be focused outside the blur circle.

The central region may focus light from a distant point object to a spot on the first optical axis at a distal focal surface. The first annular region may limit spreading of off-axis light at the distal focal surface, for example by acting as an optical beam stop, which may improve the optical contrast of images generated by the lens.

In the context of the present disclosure, the power of the central and annular regions of the lens can be defined as radial curvature power, a circumferential curvature power, a radial sagittal power, and a circumferential sagittal power.

The curvature and sagittal powers are defined as follows:

For a wavefront W, at a point a radial distance r (pupil radius) from a line normal to the centre of the wavefront, $W(r)=A*r^2$, where A is a function.

The wavefront curvature or curvature power, $P_c$, is a function of the second derivative of the wavefront. The wavefront slope, or slope based, or sagittal power $P_S$, is a function of the first derivative of the wavefront and varies with the slope of the wavefront.

The curvature power, $P_c$, is $$\frac{\partial^2 W}{\partial r^2},$$

and for a simple spherical lens, is $$\frac{\partial(2Ar)}{\partial r} = 2A.$$

The sagittal power, $P_S$, is $$\frac{1}{r}\frac{\partial W}{\partial r},$$

and for a simple spherical $$\text{lens is} = \frac{2Ar}{r} = 2A.$$

For a simple co-axial lens with spherical wavefront, with paraxial assumptions, $P_C = P_S$.

The radial curvature power is the curvature power in a direction extending radially outward from the optical axis of the lens. The circumferential curvature power is the curvature power at a constant radial coordinate, extending around the circumference of the lens.

The radial sagittal power is the sagittal power in a direction extending radially outward from the optical axis of the lens. The circumferential sagittal power is the sagittal power at a constant radial coordinate, extending around the circumference of the lens.

The central region may have a radial curvature power that is the same as the radial sagittal power and a circumferential curvature power that is the same as the circumferential sagittal power. The radial curvature power may be the same as the circumferential curvature power. The radial curvature power of the central region may hereafter be referred to as the base curvature power, or the base power. The radial sagittal power may be the same as the circumferential sagittal power. The radial sagittal power of the central region may hereafter be referred to as the base sagittal power. The base curvature power may equal the base sagittal power. The nominal power of the central region will correspond to the labelled refractive power of the contact lens as provided on the contact lens packaging (though in practice it may not have the same value). This will be the average sagittal or average curvature power taken across the central region.

For lenses used in the treatment of myopia, the base power will be negative or close to zero, and the central region will correct for distance vision. The base curvature power may be between 0.5 diopters (D) and −15.0 diopters. The base curvature power may be from −0.25 D to −15.0 D. The central region of the lens may have a curvature providing the base power.

The first annular region may have a curvature providing a radial curvature add power.

For lenses according to embodiments of the present disclosure, the first annular region will have a greater radial curvature power than the radial curvature power of the central region. Hereafter, the difference in radial curvature power of the first annular region and the central region may be referred to as a radial curvature add power, or a curvature add power. The circumferential curvature power of the first annular region may be the same as the circumferential curvature power of the central region. The net radial curvature power of the first annular region will be the sum of the base radial curvature power and the radial curvature add power. For example, a lens having a base radial curvature power of −3.0 D with a first annular region having a radial curvature add power of +4.0 D, the net radial curvature power of the first annular region will be +1.0 D.

The base curvature power of the lens may be positive, and the first annular region may have a curvature add power that is more positive than the base curvature power. In this case, the add power focal surface will be closer to the lens than the distal focal surface. An on-axis image will not be formed by light passing through the annular region. A wearer of the lens will therefore need to use the natural accommodation of their eye to bring nearby objects into focus. It may be that the light rays focused by the annular region do not intersect with the optical axis of the contact lens at all, or not until after they have passed the add power focal surface.

The base curvature power of the lens may be negative, and the first annular region may have a curvature add power that is less negative than the power of the base region, or the first annular region may have a positive curvature power. Considering the lens positioned on the cornea, if the curvature add power of the first annular region is less negative than the base power, an add power focal surface will be more anterior in the eye than the distal focal surface. Considering the lens when it is not positioned on the cornea, if the curvature add power of the first annular region is positive, an add power focal surface will be on the opposite (image) side of the lens than the distal focal surface (which will be a virtual focal surface on the object side of the lens); if the curvature add power of the first annular region is negative (but less negative than the base curvature power), a virtual add power focal surface will be further from the lens than a virtual distal focal surface.

The radial curvature add power of the first annular region may be between +0.0 D and +20.0 D, preferably between +2.0 D and +10.0 D. The curvature add power of the first annular region may have the same value, or the same power profile, along every meridian of the first annular region, i.e., the radial curvature add power may be constant in a circumferential direction around the first annular region.

In the context of the present disclosure, the first annular region is a substantially annular region that surrounds the optic zone. It may have a substantially circular shape or a substantially elliptical shape. It may fully surround the optic zone. It may partially surround the optical zone.

The first annular region of the lens will be tilted relative to the central region. As used herein, the tilting of the first annular region means radial tilting rather than lateral tilting. Thus, for example, in a radial cross section of the lens, an outer end of an arc defining the anterior surface of the first annular region may be displaced above or below its position in a corresponding un-tilted annular region. Correspondingly, in three dimensions, a circumferential boundary (formed by the ends of the radial arcs) of the first annular region may be displaced above or below its position in a corresponding un-tilted annular region. In practice, the tilting may be embodied in the optical design of an anterior surface of the first annular region of the lens. The tilting may alternatively be embodied in the optical design of a posterior surface of the first annular region of the lens, or embodied in the optical design of both anterior and posterior surfaces of the first annular region of the lens.

Tilting of the first annular region relative to the central region shifts the centre of curvature of the first annular region a first distance from the optical axis. Tilting the first annular region relative to the central region alters the radial sagittal power of the first annular region, as this is a function of the first derivative of the wavefront, but does not alter the radial curvature power of the annular region, which is a function of the second derivative of the wavefront. As a result of the tilting, the radial sagittal power of the annular region will vary across the width of the annular region. As a result of the tilting, the first annular region has a radial sagittal power profile that increases with increasing radial distance from the optical axis, with a gradient of between about 1.0 D/mm and about 20.0 D/mm, and the degree of tilting is chosen so that at a point halfway across the radial width of the first annular region, the radial sagittal power equals the average radial sagittal power of the central region. The average radial sagittal power of the central region may be determined by taking the average radial sagittal power value along a diameter of the central region. Matching the average radial sagittal power of the central region to the radial sagittal power at a point halfway across the radial width of the first annular region may provide improved control for spherical aberration. Spherical aberration may cause the average sagittal power across the first annular region to vary with the nominal, or labelled refractive power of the lens. This may result in poor vision quality for wearers of lenses having relatively high nominal powers. By matching the average radial sagittal power of the central region to the radial sagittal power at a point halfway across the radial width of the first annular region, unintentional sagittal power variations resulting from spherical aberration may be avoided.

The tilt of the first annular region will give rise to a radial sagittal power that is a ramp function, starting more negative than the radial sagittal power at the outer edge of the central region, and increasing with increasing radial distance from the optical axis of the lens. The radial sagittal power profile across the first annular region from an inner edge of the first annular region (i.e., an edge closest to the optical axis of the lens) to the outer edge (i.e., an edge closest to the peripheral region) may be defined by a curve or line having a positive gradient of between about 1.0 D/mm and about 20.0 D/mm, preferably between about 1.0 D/mm and about 6.0 D/mm. The radial sagittal power profile across the first annular region may be linear, or may be defined by a curve having an average gradient of between about 1.0 D/mm and about 20.0 D/mm, preferably between about 1.0 D/mm and about 6.0 D/mm.

The first annular region may have a radial sagittal power profile that increases with increasing radial distance from the optical axis, with a gradient of between about 2.0 D/mm and about 20.0 D/mm, preferably between about 4.0 D/mm and about 12.0 D/mm. Alternatively, the first annular region may have a radial sagittal power profile that increases with increasing radial distance from the optical axis with a gradient of between about 1.0 D/mm and about 6.0 D/mm. The gradient will be dependent, in part, upon the radial curvature power of the first annular region. For a given tilt of the first annular region relative to the central region, the greater the curvature add power of the first annular region, the greater the gradient of the sagittal power increase across the first annular region will be.

The circumferential sagittal power of the first annular region at a point halfway across the width of the annular region may be the same as the circumferential sagittal power of the central region. The average circumferential sagittal power of the annular region may be the same as the circumferential sagittal power of the central region.

The radial sagittal power across the central region of the lens may be approximately constant. The radial curvature power across the central region may be approximately constant. The radial curvature power across the first annular region may be approximately constant, and it will be greater than the radial curvature power across the central region.

The radial sagittal power at the inner edge of the first annular region (i.e., at the edge closest to the central region) may be between 0.1 D and 5.0 D less than the radial sagittal power at the outer edge of the central region. The radial sagittal power at the inner edge of the first annular region (i.e., at the edge closest to the central region) may be preferably between about 0.5 D and 2.5 D less than the radial sagittal power at the outer edge of the central region. The radial sagittal power at the outermost edge of the first annular region (i.e., at the edge closest to the peripheral zone) may be between 0.1 D and 5.0 D greater than the radial sagittal power at the outer edge of the central region. The radial sagittal power at the outer edge of the first annular region (i.e., at the edge closest to the peripheral zone) may preferably be between 0.5 D and 2.0 D greater than the radial sagittal power at the outer edge of the central region.

The lens may comprise at least one additional annular region that is concentric to the first annular region. Each additional annular region will be tilted relative to the central region, and as a result each additional annular region will have an off-axis centre of curvature that is a second distance from the optical axis. Each additional annular region will have a sagittal power profile that increases with increasing radial distance from the optical axis, with a gradient of between about 1.0 D/mm and about 20.0 D/mm. Each additional annular region may have a sagittal power profile that increases with increasing radial distance from the optical axis with a gradient of between or between about 4.0 D/mm and about 20.0 D/mm. Alternatively, each additional annular region may have a sagittal power profile that increases with increasing radial distance from the optical axis with a gradient of between about 1.0 D/mm and 3.5 D/mm.

Each additional annular region may have a radial curvature power that is greater than the radial curvature power of the central region. Each additional annular region may have the same radial curvature power as the first annular region, or a different radial curvature power to the first annular region.

At a point halfway across the radial width of each additional annular region, the radial sagittal power of that region may equal the average radial sagittal power of the central region, and this may provide improved control for spherical aberration.

In a similar manner to the first annular region, each additional annular region will be tilted relative to the central region. Each additional annular region may be tilted relative to the central region by the same amount as the first annular region, or by a different amount to the first annular region. Tilting each additional annular region relative to the central region shifts the centre of curvature of that annular region away from the optical axis. The centre of curvature of each additional annular region may be shifted away from the optical axis by the same distance as the centre of curvature of the first annular region. Alternatively, the centre of curvature of each additional annular region may be shifted away from the optical axis by a different distance to the centre of curvature of the first annular region.

Tilting each additional annular region relative to the central region will alter the radial sagittal power of that annular region, as this is a function of the first derivative of the wavefront. The tilting will not alter the radial curvature power of the annular region, as this is a function of the second derivative of the wavefront. As a result of the tilting, each additional annular region may have the same variation in radial sagittal power as the first annular region, or a different variation in radial sagittal power to the first annular region. Each additional annular region may a different radial sagittal power gradient to the first annular region as a result of different tilting of each annular region relative to the central region or as a result of having a different curvature add power compared to the first annular region.

The radial sagittal power profile of each additional annular region may dependent upon the radial position of the additional annular region. An annular region at a greater radial distance from the optical axis may have a greater radial sagittal power gradient, or a smaller radial sagittal power gradient, than the first annular region. An annular region at a greater radial distance from the optical axis may have a smaller radial sagittal power gradient than the first annular region because, at a greater radial distance from the optical axis, a given radial curvature power may be achieved with a smaller radial sagittal power gradient. In between the first annular region and each additional annular region, the lens may have a radial curvature power that is less than the radial curvature power of the first annular region. Regions of the lens in between concentric annular regions may hereafter be referred to as distance power regions. In between concentric annular regions, the lens may have the base radial curvature power. In between concentric annular regions, the lens may have a curvature centred on the optical axis. The radial sagittal power profile of the lens between the annular regions may be similar to the radial sagittal power profile of the central region. The lens may comprise a plurality of concentric additional annular regions. The additional annular regions may be separated by distance regions having the base curvature power.

At a point halfway across the radial width of each additional annular region, the radial sagittal power of the annular region may match the average radial sagittal power of the central region.

The curvature add power of each additional annular region may have the same value, or the same power profile, along every meridian of the annular region, i.e., the radial curvature add power may be constant in a circumferential direction around the annular region. The curvatures providing the base curvature power and the curvature add power of the first annular region and any additional annular regions may be curvatures of the anterior surface of the lens. The curvatures providing the base curvature and the curvature add power of the first annular region and any additional annular regions may be curvatures of the posterior surface of the lens. The curvatures providing the base curvature power and the curvature add power of the first annular region and any additional annular regions may be curvatures of the anterior surface and the posterior surface of the lens providing a combined effect.

The contact lens may be a toric contact lens. For example, the toric contact lens may include an optic zone shaped to correct for a person's astigmatism.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

By way of example, the lens may comprise a hydrogel or silicone hydrogel contact lens having a lens diameter of between 13 and 15 mm.

According to a second aspect, the present disclosure provides a method of manufacturing a contact lens. The method may comprise forming a contact lens, wherein the lens comprises a central region, having a centre of curvature that is on an optical axis. The lens comprises a first annular region. The first annular region has an off-axis centre of curvature that is a first distance from the optical axis. The first annular region has a sagittal power profile that increases with increasing radial distance from the optical axis with a gradient of between about 1.0 D/mm and about 20.0 D/mm. At a point halfway across the radial width of the first annular region, the radial sagittal power equals the average radial sagittal power of the central region.

The lens may include any of the features set out in respect of the first aspect above.

The first annular region of the lens will be tilted relative to the central region. Tilting of the first annular region relative to the central region shifts the centre of curvature of the first annular region a first distance from the optical axis. As a result of the tilting, the first annular region has a radial sagittal power profile that increases with increasing radial distance from the optical axis, with a gradient of between about 1.0 D/mm and about 20.0 D/mm, and at a point halfway across the radial width of the first annular region, the radial sagittal power equals the average radial sagittal power of the central region.

The method of manufacturing the lens may comprise tilting the first annular region relative to the central region, such that the centre of curvature of the first annular region a first distance from the optical axis, and such that the first annular region has a radial sagittal power profile that increases with increasing radial distance from the optical axis, with a gradient of between about 1.0 D/mm and about 20.0 D/mm, and at a point halfway across the radial width of the first annular region, the radial sagittal power equals the average radial sagittal power of the central region. In practice, tilting may comprise incorporating a tilt into the optical design of the anterior surface of the first annular region of the first annular region of the lens, or into the posterior surface of the first annular region of the lens, or into both the anterior and posterior surfaces of the first annular region of the lens. The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

The method may include a step of cast moulding the contact lens by causing polymerisation of a contact lens formulation located between a female mould member and a male mould member of a contact lens mould assembly. Alternatively, the method may comprise a step of lathing a surface of the contact lens. For example, an anterior surface of the contact lens may be cut using a lathe to provide the desired optical properties.

The contact lens may be a molded contact lens. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

In a third aspect of the disclosure there is also provided a method of using the contact lens described herein. The methods may be effective in reducing progression of a refractive error, such as reducing the progression of myopia. When the present lenses are used to reduce the progression of myopia, the methods include a step of providing the contact lenses to a person whose eyes are able to accommodate for varying near distances (e.g., in a range of from about 15 cm to about 40 cm). Some embodiments of the methods include a step of providing the ophthalmic lenses to a person that is from about 5 years old to about 25 years old. The providing can be performed by an eye care practitioner, such as an optician or optometrist. Alternatively, the providing can be performed by a lens distributor that arranges for the delivery of the ophthalmic lenses to the lens wearer.

Figures 2A, 2B, 2C:
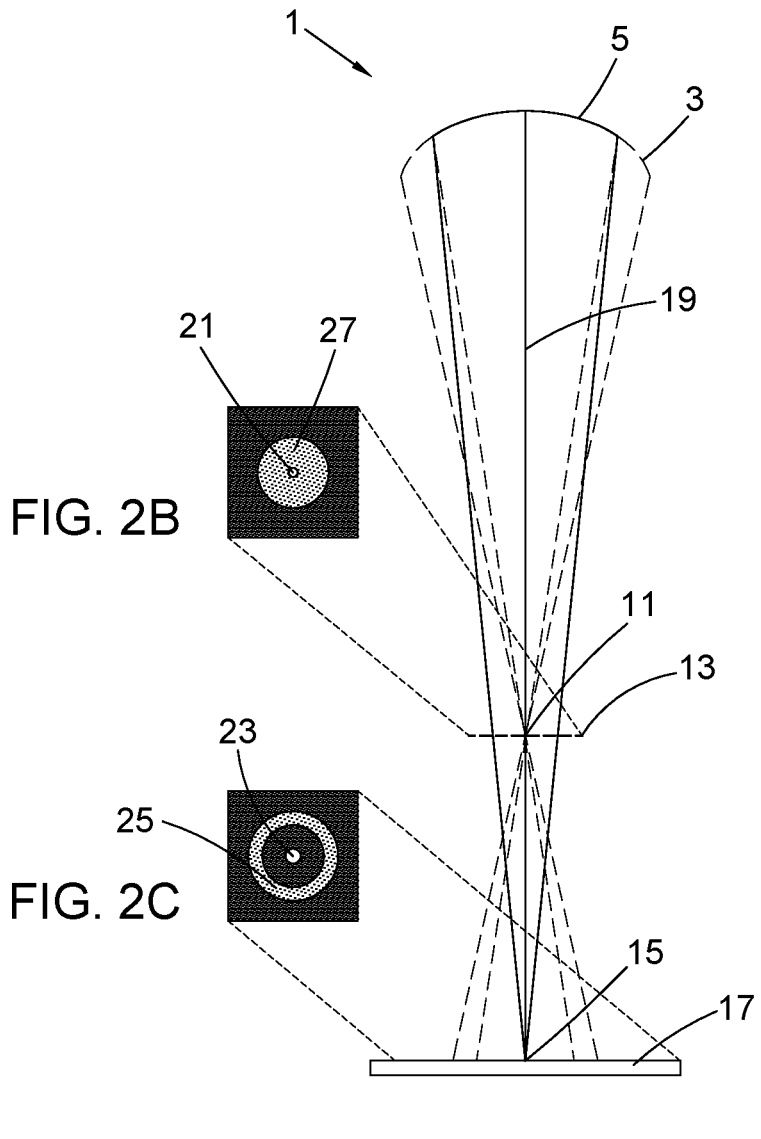
FIG. 2A is a schematic ray diagram for the lens of FIGS. 1A-B, when the lens is positioned on an eye.
FIG. 2B shows a light pattern at a proximal focal surface of the lens of FIG. 1A formed from a distant point source, when the lens is positioned on an eye.
FIG. 2C shows a light pattern at a distal focal surface of the lens of FIG. 1A formed from a distant point source, when the lens is positioned on an eye.

FIG. 1A shows a schematic top view of a prior art lens for use in the slowing progression of myopia (e.g., myopia control). The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, providing ballasting to prevent rotation of the lens 1, and providing a shaped region that improves comfort for the lens 1 wearer. The optic zone 2 provides the optical functionality of the lens 1, and the optic zone comprises an annular region 3 and a central region 5. For this lens 1, the annular region 3 has a greater radial curvature power than the base curvature power of the central region 5. FIG. 2A is a schematic ray diagram showing how the lens 1 of FIG. 1A-1B focuses light when the lens is positioned on an eye. The focus 11 of the annular region 3 lies on a proximal focal surface 13, and the focus 15 for the central region 5 lies on a distal focal surface 17, which is further away from the posterior surface of the lens 1. The focus 11 of the annular region 3 and the focus 15 of the central region 5 share a common optical axis 19. As shown in FIGS. 2B and 2C, for a point source at infinity, light rays focused by the central region 5 form a focused image 23 at the distal focal surface 17. Light rays focused by the central region 5 also produce an unfocused blur spot 27 at the proximal focal surface 13. Light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of the lens 1 seeing a 'halo' around focused distance images.

Figures 3A, 3B:
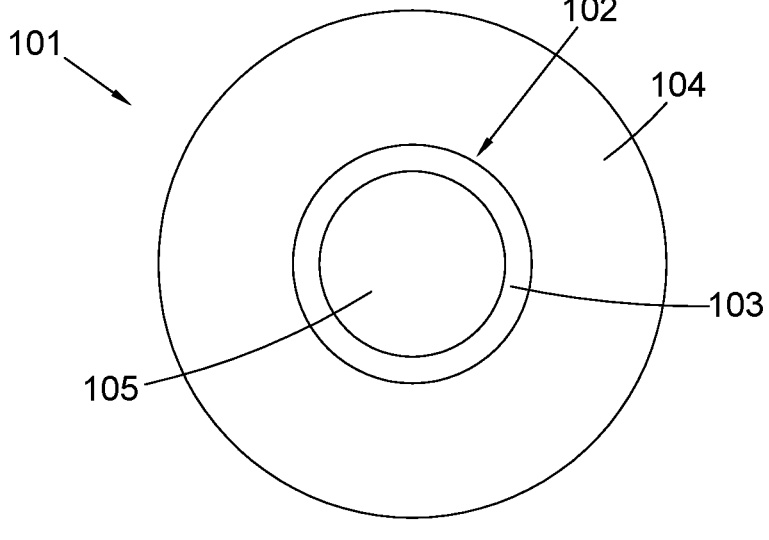
FIG. 3A is a top view of a lens according to an embodiment of the present disclosure.
FIG. 3B is a side view of the contact lens of FIG. 3A.
Figures 4A, 4B, 4C:
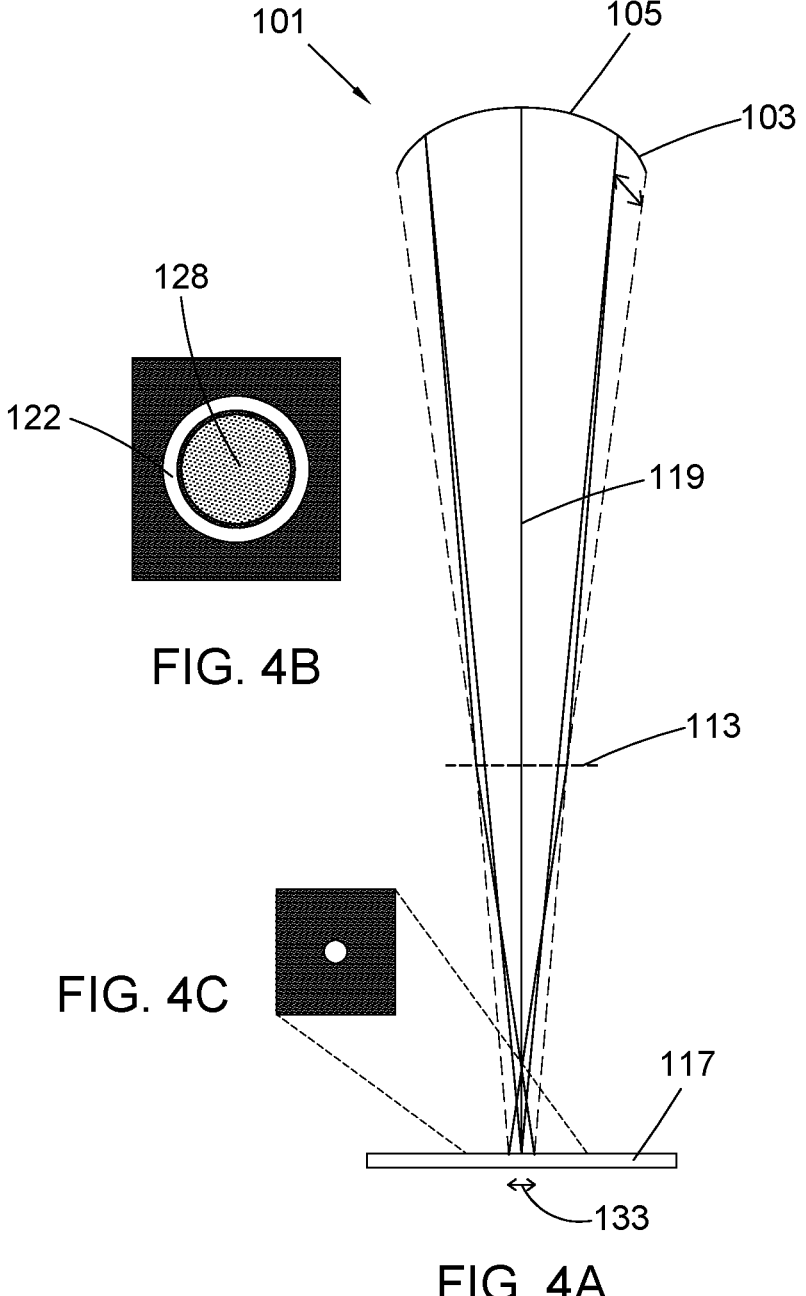
FIG. 4A is a schematic ray diagram for the lens of FIGS. 3A-B, when the lens is positioned on an eye.
FIG. 4B shows a light pattern at a proximal focal surface of the lens of FIGS. 3A-B formed from a distant point source, when the lens is positioned on an eye.
FIG. 4C shows a light pattern at a distal focal surface of the lens of FIGS. 3A-B formed from a distant point source, when the lens is positioned on an eye.
Figure 4D:
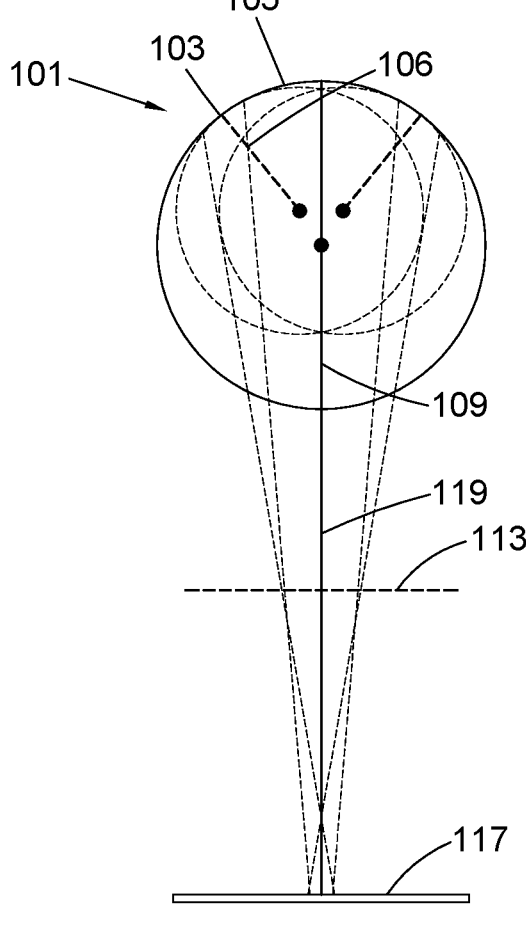
FIG. 4D is a partial ray diagram for the lens of FIGS. 3A-B, when the lens is positioned on an eye, together with circles indicating the radii of curvature of the central distance region (solid circle) and the annular add region (dashed circle) of the contact lens.

FIG. 3A shows a schematic of a lens 101 according to an embodiment of the present disclosure. Similar to the prior art lens 1 shown in FIGS. 1A and 1B the lens 101 comprises an optic zone 102 and a peripheral zone 104 surrounding the optic zone 102. The optic zone 102 comprises a central region 105 and a first annular region 103 that surrounds the central region 105. As shown in FIG. 4A, the central region 105 has a centre of curvature that is on an optical axis 119. The first annular region 103 is tilted relative to the central region 105, and the first annular region 103 has an off-axis centre of curvature that is a first distance from the optical axis 119. The anterior surface of the first annular region 103 has a greater curvature than the anterior surface of the central region 105, and therefore provides a greater curvature power than the base curvature power of the central region 105. FIG. 4D is a partial ray diagram for the lens 101 of FIGS. 3A-B, when the lens 101 is positioned on an eye, together with circles indicating the radii of curvature of the central distance region (solid circle) and the annular add region (dashed circle) of the lens 101. As shown in FIG. 4D, the anterior surface of the central region 105 defines a portion of a surface of a sphere of larger radius 109. The anterior surface of the annular region 103 defines a curved annular surface with smaller radius 106.

FIG. 4C shows a light pattern at a distal focal surface of the lens of FIGS. 3A-B formed from a distant point source, when the lens 101 is positioned on an eye. At the distal focal surface 117, light rays passing through the central region 105 are focused. The annular region 103 acts as an optical beam stop, which leads to a small spot size 133 (FIG. 4A) of light at the distal focal surface 117, as shown in FIG. 4C.

FIG. 4B shows a light pattern at a proximal focal surface of the lens 101 of FIGS. 3A-B formed from a distant point source, when the lens is positioned on an eye. A single image is not formed at the proximal focal surface 113. As shown in FIG. 4B, at the proximal focal surface 113, for a point source at infinity, light rays passing through the central region 105 generate a blur circle 128, as does the lens of FIGS. 1A-B and 2A-B. However, light rays from a distant point source passing through the annular region 103 generate a focused annulus 122, as shown in FIG. 4B, which surrounds the blur circle 128. FIG. 4B shows the light pattern generated for a distant point source. In contrast to the prior art lens 1 of FIG. 1, the lens 101 of FIGS. 3 and 4 does not generate a single image or an on-axis image at the proximal focal surface 113 that could be used to avoid the need for the eye to accommodate for near objects. For an extended object at distance, the focused image formed at the proximal focal surface 113 is a convolution of (i) the focused image of the extended object that would be obtained with a conventional lens having the optical power of the annular region 103 and (ii) an optical transfer function representing the optical effect of the annular region 103.

In contrast to the prior art lens of FIGS. 1 and 2, an annulus or 'halo' effect does not occur at the distal focal surface 117.

Figure 5:
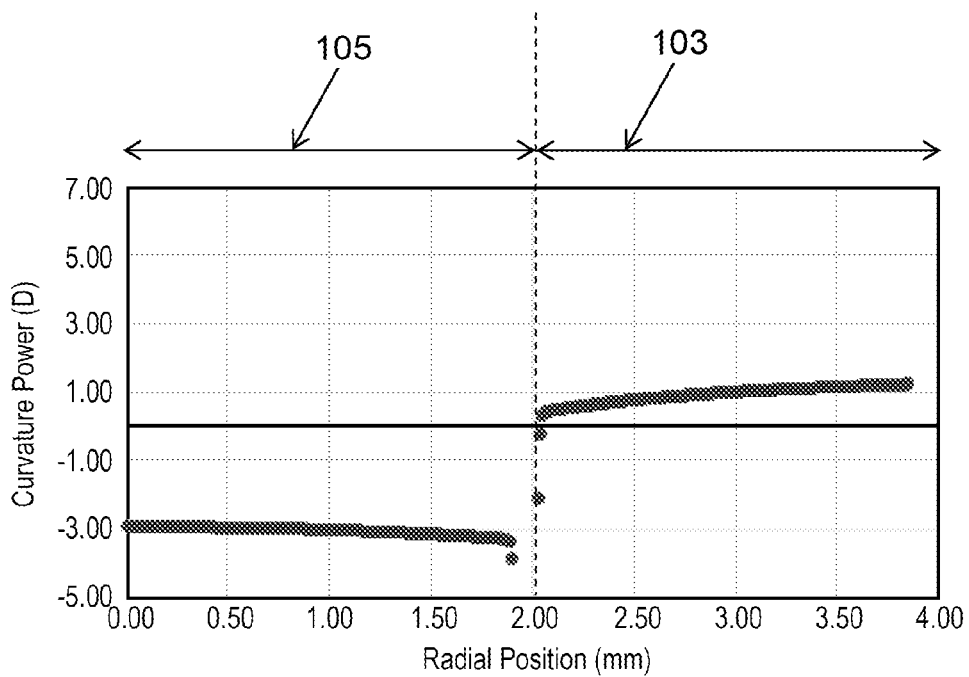
FIG. 5 is a curvature power plot for the lens of FIGS. 3A-B, as a function of radial distance from the optical axis of the lens.

FIG. 5 shows the radial curvature power profile of the lens 101 shown in FIGS. 3A-3B. The radial curvature power in Dioptres (D) is plotted as a function of radial distance from the optical axis 119 of the lens 101. The x-axis of the graph is labelled as radial position in mm (with 0.00 mm coinciding with the optical axis 119 of the lens). The lens 101 of FIGS. 3A-3B has a base curvature power of −3.0 D across the central region, which extends radially outwards to a distance of around 2.00 mm from the optical axis 119. The annular region 103 has a curvature providing a radial curvature add power of +4.0 D. The radial curvature add power is approximately constant across the width of the first annular region 103. As discussed above, the radial curvature power is a function of the curvature of the lens 101, i.e., the second derivative of the wavefront, and is not affected by a tilt of the annular region 103 relative to the central region 105.

Figure 6:
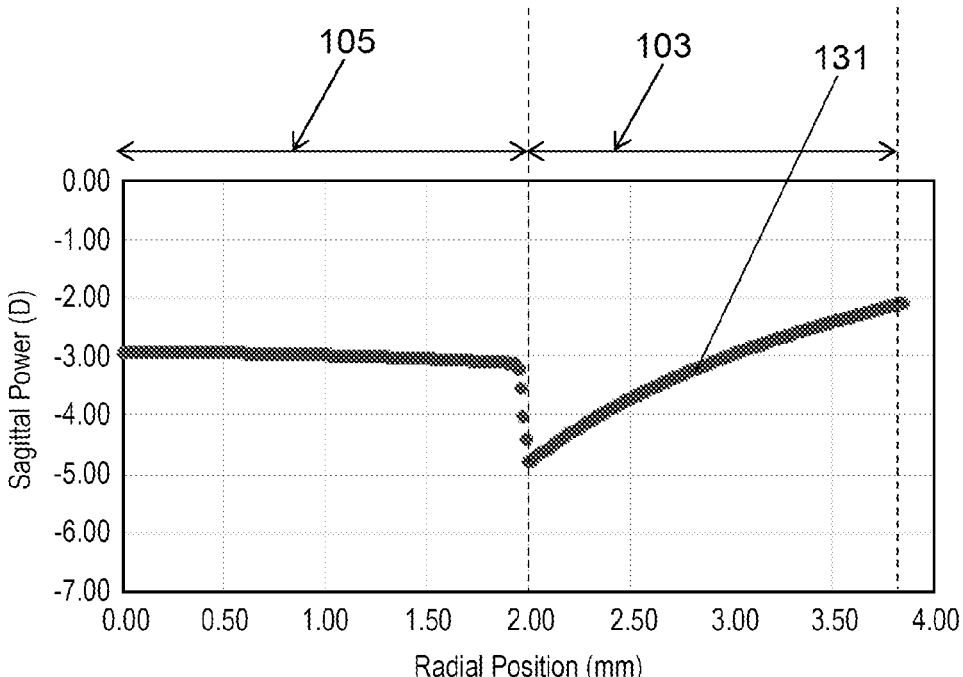
FIG. 6 is a sagittal power plot for the lens of FIGS. 3A-B, as a function of radial distance from the optical axis of the lens.

FIG. 6 shows the radial sagittal power profile of the lens 101 shown in FIGS. 3A-3B. The radial sagittal power in Dioptres (D) is plotted as a function of radial distance from the optical axis 119 of the lens 101.

As shown in FIG. 6, across the central region 105 of the lens 101, which extends out to a radial distance of approximately 2.00 mm, the radial sagittal power is approximately constant and has a value of −3.0 D. For the lens shown in FIGS. 3 and 4, the annular region 103 is tilted such that the centre of a circle that defines the radius of curvature of the anterior surface of the annular region 103 is shifted relative to the centre of a circle that defines the radius of curvature of the anterior surface of the central region 105. As the radial sagittal power is a function of the slope of the lens surface, the tilt the annular region 103 relative to the central region 105 gives rise to a radial sagittal power variation across the annular region 103 that is a ramp function 131 starting more negative than the radial sagittal power of the central region 105 and increasing with increasing radius to a radial sagittal power that is more positive than the radial power of the central region 105. The gradient of the radial sagittal power ramp 131 across the first annular region 103 is dependent upon the tilt of the first annular region 103 relative to the central region 105, and dependent upon the curvature add power of the first annular region 103. The ramp 131 is curved and has an average gradient of approximately 1.5 D/mm. The tilt of the annular region 103 is chosen so that the radial sagittal power of the lens 301 at the radial midpoint of the annular region 103 (i.e., halfway across the radial width of the annular region) 103 equals the average radial sagittal power of the central region 105.

Figure 7:
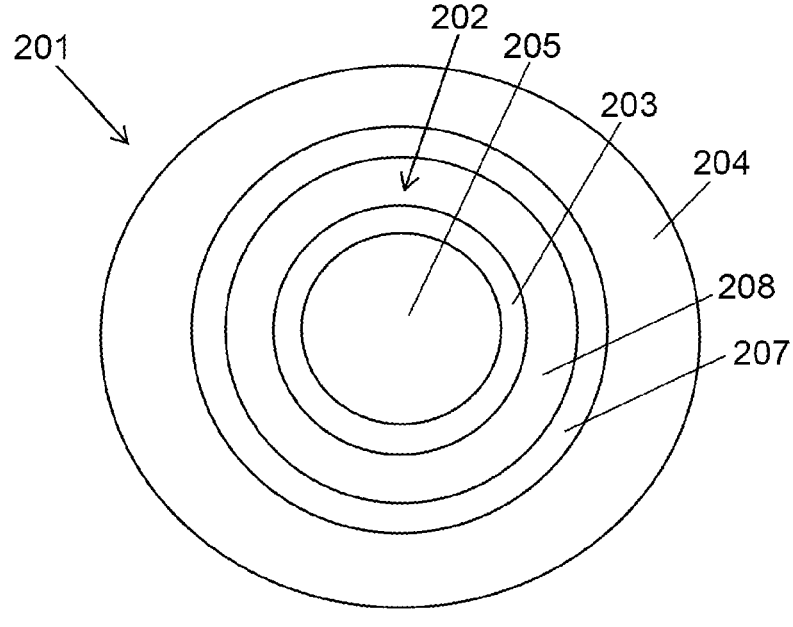
FIG. 7 is a top view of another lens according to an embodiment of the present disclosure, having two concentric annular regions, each annular region having a curvature add power of +4.0 D.

FIG. 7 shows a schematic of another lens 201 according to an embodiment of the present disclosure. The lens 201 comprises an optic zone 202 and a peripheral zone 204 surrounding the optic zone 202. The optic zone 202 comprises a central region 205, a first annular region 203 that surrounds the central region 205, and a second concentric annular region 207, which is at a greater radial distance from the central region 205 than the first annular region. Similar to the lens shown in FIG. 3A, the central region 205 has a centre of curvature that is on an optical axis. The first annular region 203 is tilted relative to the central region 205, and the first annular region 203 has an off-axis centre of curvature that is a first distance from the optical axis. The anterior surface of the first annular region 203 has a greater curvature than the anterior surface of the central region 205, and provides a greater radial curvature power than the base curvature power of the central region 205. The first annular region 203 has a curvature providing a radial curvature add power of +4.0 D.

The second annular region 207 is also tilted relative to the central region 205, but by a different amount compared to the first annular region 203. The second annular region 207 has an off-axis centre of curvature that is a first distance from the optical axis. The anterior surface of the second annular region 207 has a greater curvature than the anterior surface of the central region 205, and therefore provides a greater radial curvature power than the base radial curvature power of the central region 205. The second annular region 207 also has a curvature providing a radial curvature add power of +4.0 D.

Figure 8:
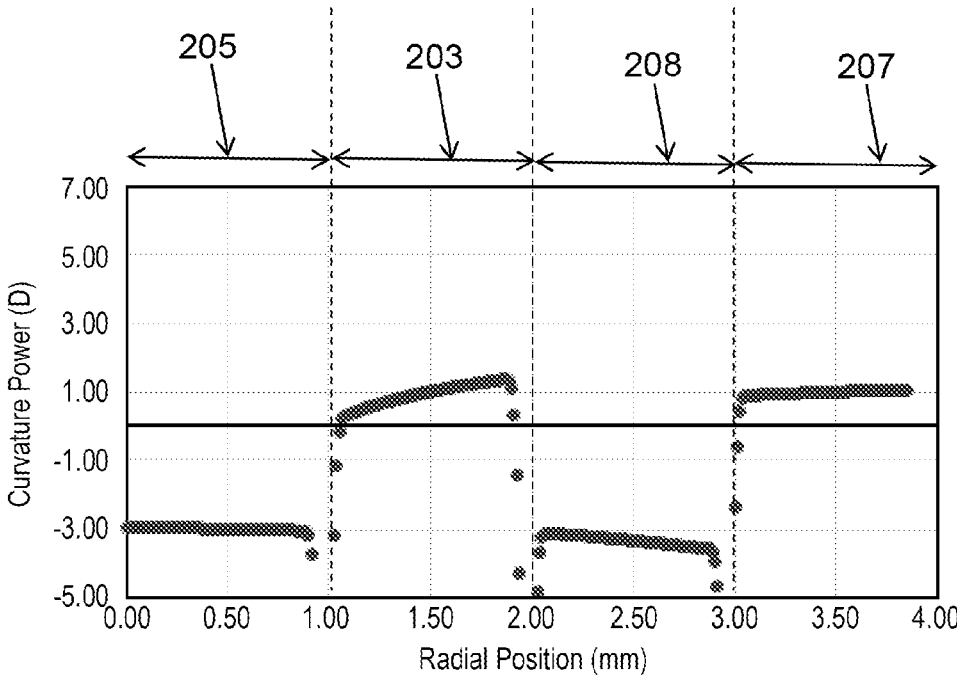
FIG. 8 is a curvature power plot for the lens of FIG. 7, as a function of radial distance from the optical axis of the lens.

FIG. 8 shows the radial curvature power profile of the lens 201 shown in FIG. 7. The radial curvature power in Dioptres (D) is plotted as a function of radial distance from the centre of the lens 201, with a radial position of 0.00 mm coinciding with the optical axis. The lens 201 of FIG. 7 has a base radial curvature power of −3.0 D across the central region. The first annular region 203 has a curvature providing a radial curvature add power of +4.0 D. The radial curvature add power is approximately constant across the width of the first annular region 203. The second annular region 207 also has a curvature providing a radial curvature add power of +4.0 D. In between the first annular region 203 and the second annular region 207, there is a distance region 208 of the lens 201 that has a curvature providing the base radial curvature power.

Figure 9:
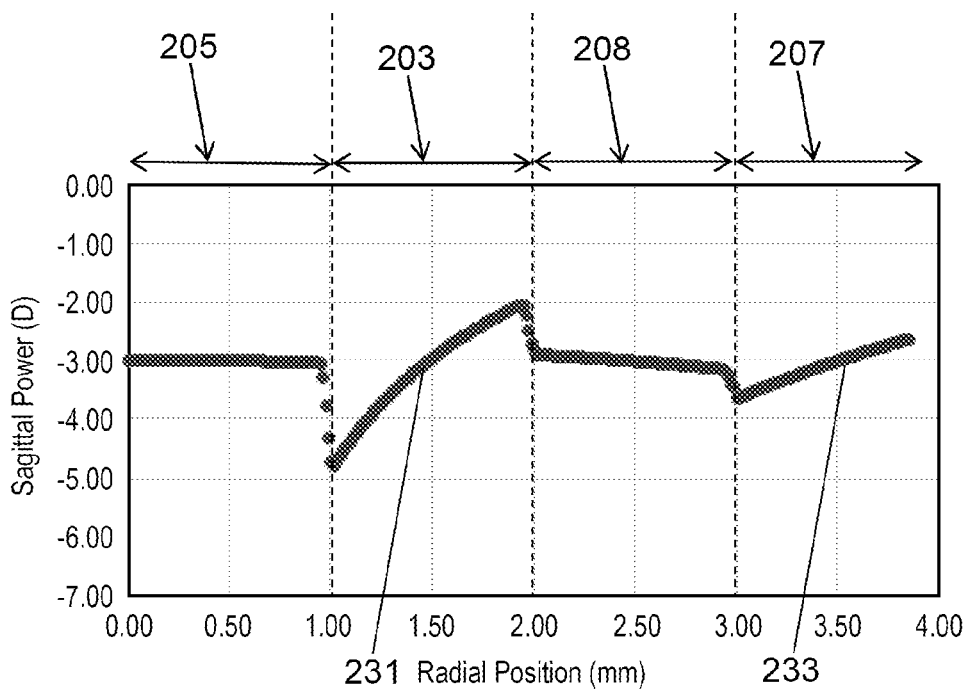
FIG. 9 is a sagittal power plot for the lens of FIG. 7, as a function of radial distance from the optical axis of the lens.

FIG. 9 shows the sagittal power profile of the lens 201 shown in FIG. 7. The radial sagittal power in Dioptres (D) is plotted as a function of radial distance from the optical axis, with a radial position of 0.00 mm coinciding with the optical axis. Similar to the plot shown in FIG. 6, the variation of radial sagittal power is approximately constant (and equal) across the central region 205 of the lens 201.

The first annular region 203 is tilted such that the centre of a circle that defines the radius of curvature of the anterior surface of the annular region 203 is shifted relative to the centre of a circle that defines the radius of curvature of the anterior surface of the central region 205. Because the radial sagittal power is a function of the slope of the lens surface, the tilt of the first annular region 203 relative to the central region 205 gives rise to a sagittal power that is a ramp function 231 starting more negative than the radial sagittal power of the central region 205 and increasing with increasing radius to a radial sagittal power that is more positive than the radial sagittal power of the central region 205. The gradient of the radial sagittal power across the first annular region 203 is dependent upon the tilt of the first annular region 203 relative to the central region 205, and dependent upon the radial curvature add power of the first annular region 203. The ramp 231 is curved, and has an average gradient of approximately 2.9 D/mm. The tilt of the annular region 203 is chosen such that the radial sagittal power of the lens 201 at the radial midpoint of the first annular region 203 equals the average radial sagittal power of the central region 205.

The second annular region 207 is also tilted relative to the central region 205 such that the centre of a circle that defines the radius of curvature of the anterior surface of the second annular region 207 is shifted relative to the centre of a circle that defines the radius of curvature of the anterior surface of the central region 205. The tilt of the second annular region 207 relative to the central region 205 gives rise to a radial sagittal power profile that is a ramp function 233 starting more negative than radial sagittal power of the central region 205 at the inner edge of the annular region 203 and increases with increasing radius to radial sagittal power that is more positive than the radial sagittal power across the central region 205. The tilt of the second annular region 207 relative to the central region 205, is different to the tilt of the first annular region 203. The sagittal power profile for the second annular region 203 is curved, and has an average gradient of approximately 1.1 D/mm. The tilt of the annular region 203 has been chosen to ensure that the sagittal power of the lens 201 at the radial midpoint of the first annular region 203 equals the average radial sagittal power of the central region 205.

In between the first annular region 203 and the second annular region 207 there is a distance region 208 of the lens

201. The distance region 208 in between the first annular region 203 and the second annular region 207 nominally has the same power as the central region 205, but depending on choice of asphericity and common lens design practices, can have the same or somewhat more or less negative power than the central region 205.

Figure 10:
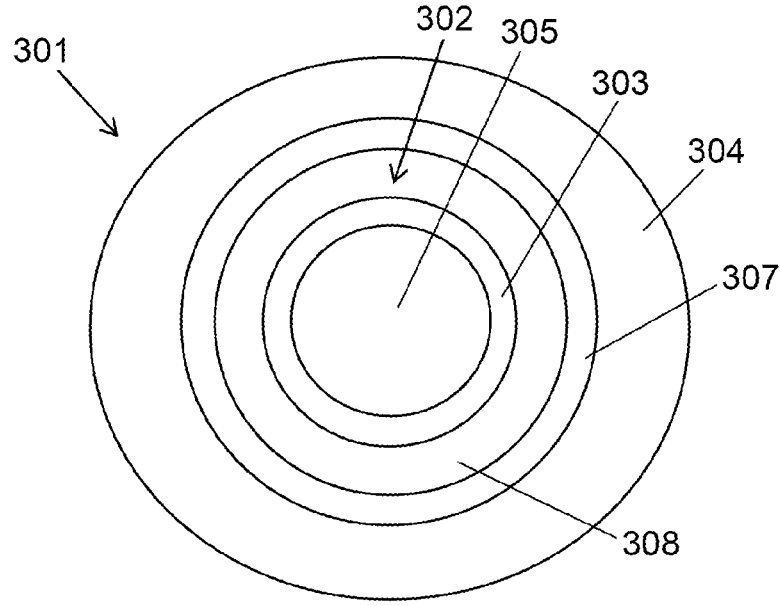
FIG. 10 is a top view of another lens according to an embodiment of the present disclosure, having two concentric annular regions, each annular region having a curvature add power of +8.0 D.

FIG. 10 shows a schematic of another lens 301 according to an embodiment of the present disclosure. Similar to the lens 201 shown in FIG. 7, the lens 301 comprises an optic zone 302 and a peripheral zone 304 surrounding the optic zone 302. The optic zone 302 comprises a central region 305, a first annular region 303 that surrounds the central region 305, and a second concentric annular region 307, which is at a greater radial distance from the central region 305 than the first annular region. Similar to the lens shown in FIG. 3A and FIG. 7, the central region 305 has a centre of curvature that is on an optical axis. The first annular region 303 is tilted relative to the central region 305, and the first annular region 303 has an off-axis centre of curvature that is a first distance from the optical axis. The anterior surface of the first annular region 303 has a greater curvature than the anterior surface of the central region 305, and therefore provides a greater radial curvature power than the base curvature power of the central region 305. The anterior surface of the first annular region 303 has a greater curvature than the anterior surface of the central region 305, and therefore provides a greater radial curvature power than the base radial curvature power of the central region 305. The first annular region 303 has a curvature providing a radial curvature add power of +8.0 D, i.e., a significantly greater radial curvature add power than the lens shown in FIG. 7.

The second annular region 307 is also tilted relative to the central region 305, but by a different amount to the first annular region 303. The second annular region 307 has an off-axis centre of curvature that is a first distance from the optical axis. The anterior surface of the second annular region 307 has a greater curvature than the anterior surface of the central region 305, and therefore provides a greater radial curvature power than the base radial curvature power 305 of the central region. The second annular region 303 also has a curvature providing a radial add curvature power of +10.0 D.

Figure 11:
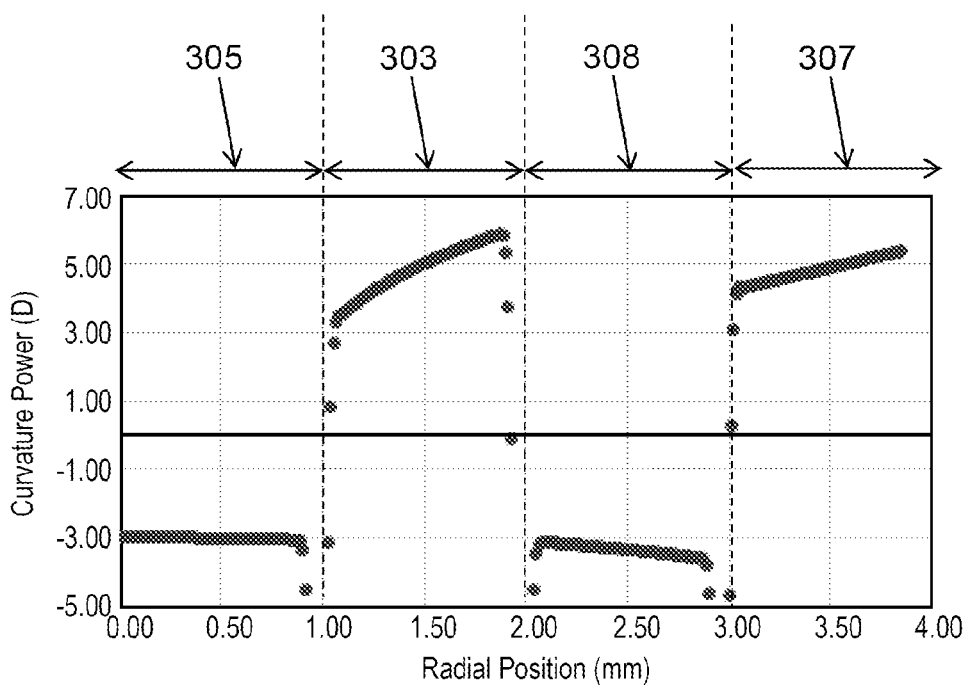
FIG. 11 is a curvature power plot for the lens of FIG. 10, as a function of radial distance from the optical axis of the lens.

FIG. 11 shows the radial curvature power profile of the lens 301 shown in FIG. 10. The lens of FIG. 7 has a base radial curvature power of −3.0 D across the central region 305. The radial curvature power in Dioptres (D) is plotted as a function of radial distance from the centre of the lens 301, with a radial position of 0.0 mm corresponding to the optical axis. The first annular region 303 has a curvature providing a radial curvature add power of +8.0 D. The radial curvature add power is approximately constant across the width of the first annular region 303. The second annular region 307 also has a curvature providing a radial curvature add power of +8.0 D. In between the first annular region 303 and the second annular region 307, there is a distance region 308 of the lens 301 that has a curvature that provides the base curvature power.

Figure 12:
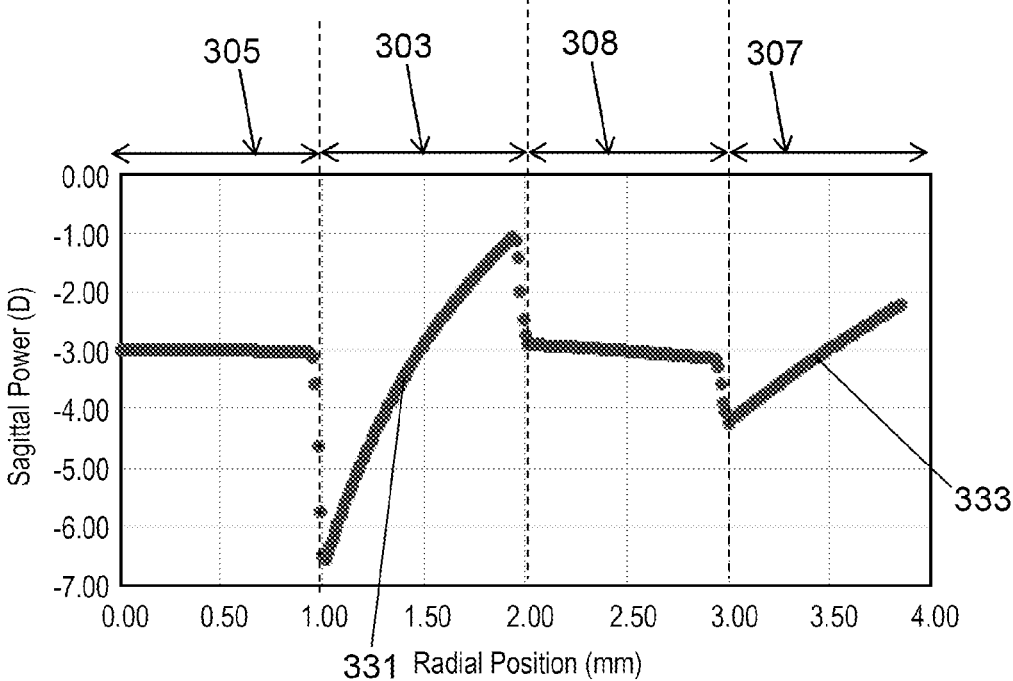
FIG. 12 is a sagittal power plot for the lens of FIG. 10, as a function of radial distance from the optical axis of the lens.

FIG. 12 shows the radial sagittal power profile of the lens 301 shown in FIG. 10. The radial sagittal power in Dioptres (D) is plotted as a function of radial distance from the centre of the lens 301, with a radial position of 0.00 mm corresponding to the optical axis. Similar to the lenses shown in FIG. 3 and FIG. 7, the variation of radial sagittal power is approximately constant across the central region 305 of the lens 301.

The first annular region 303 is tilted such that the centre of a circle that defines the radius of curvature of the anterior surface of the annular region 303 is shifted relative to the centre of a circle that defines the radius of curvature of the anterior surface of the central region 305. Because the radial sagittal power is a function of the slope of the lens surface, the tilt of the first annular region 303 relative to the central region 305 gives rise to a sagittal power that is a ramp function 331 starting more negative than the radial sagittal power of the central region at the inner edge of the annular region 303 and increasing with increasing radius to a radial sagittal power that is more positive than the radial sagittal power of the central region 305 at the outer edge of the annular region 303. The radial curvature add power 303 of the first annular region (as shown in FIG. 11) is significantly greater than the radial curvature add power of the first annular region 303 of the lens 201 shown in FIG. 7. This results in a steeper gradient of the radial sagittal power profile across the first annular region 303. The ramp 331 is curved and the average gradient is approximately 5.5 D/mm. The tilt of the annular region 303 has been chosen to ensure that the radial sagittal power of the lens 301 at the radial midpoint of the first annular region 303 equals the average radial power of the central region 305.

The second annular region 307 is also tilted such that the centre of a circle that defines the radius of curvature of the anterior surface of the second annular region 307 is shifted relative to the centre of a circle that defines the radius of curvature of the anterior surface of the central region 305. The tilt of the second annular region 307 relative to the central region 305 gives rise to a radial sagittal power profile that is a ramp function 333 starting more negative than radial sagittal power of the central region 305 at the inner edge of the annular region 303 and increases with increasing radius to a radial sagittal power that is more positive than the radial sagittal power across the central region 305. The tilt of the second annular region 307 relative to the central region 305 is different to the tilt of the first annular region 303.

The ramp 333 is curved, with an average gradient of approximately 2.2 D/mm. The tilt of the annular region 303 has been chosen to ensure that the radial sagittal power of the lens 301 at the radial midpoint of the first annular region 303 equals the average radial sagittal power of the central region 305.

In between the first annular region 303 and the second annular region 305 there is a distance region 308 of the lens 301. The distance region 308 in between the first annular region 303 and the second 307 nominally has the same power as the central region 305, but depending on choice of asphericity and common lens design practices, can have the same or somewhat more or less negative power than the central region 305.

Figure 13A:
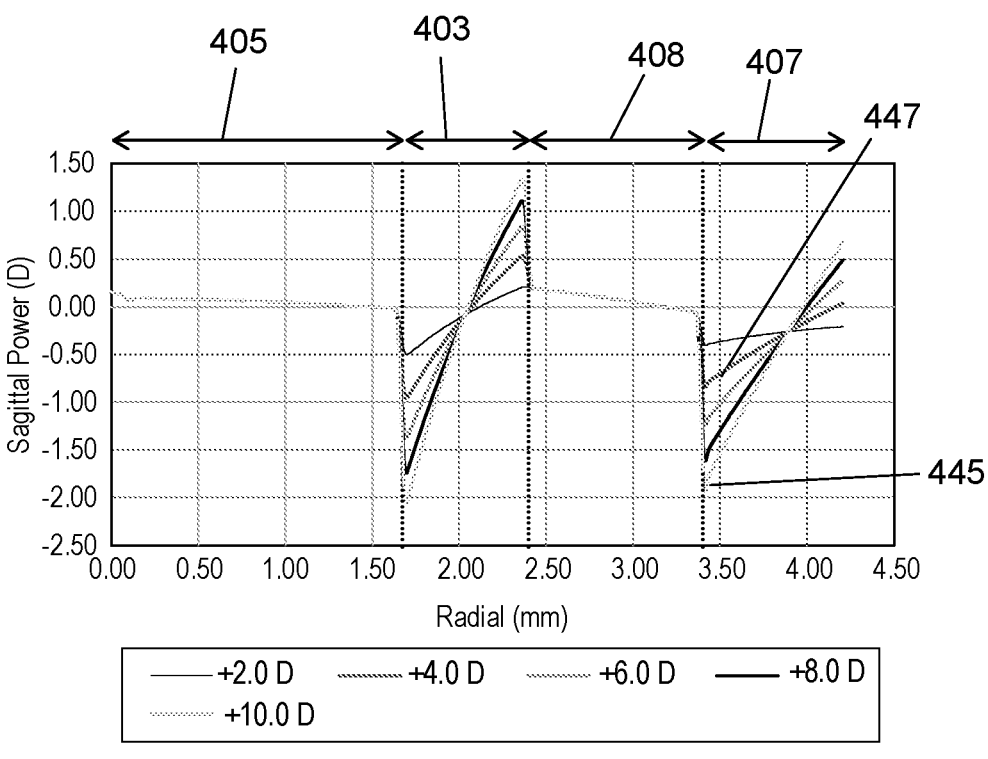
FIG. 13A is a plot showing sagittal power variation as a function of radial distance for lenses having a variety of different curvature add powers.

As explained above, for lenses according to embodiments of the present disclosure the gradient of the radial sagittal power profile across an annular region is dependent upon the radial curvature add power of the annular region, and dependent upon the tilt of the annular region relative to the central region of the lens. FIG. 13A shows radial sagittal power curves as a function of radial distance from the optical axis for lenses having different radial curvature add powers ranging from +2.0 D to +10.0 D. Each lens has two concentric annular regions with the first annular region (indicated as region 403) being closer to the central region (indicated as region 405) than the second annular region (indicated as region 407). For each lens, the radial sagittal power across the central region 405 is approximately constant. For each lens, at the boundary between the central region and the first annular region, there is a dip in the radial sagittal power as a result of the tilt of the first annular region

Figure 13B:
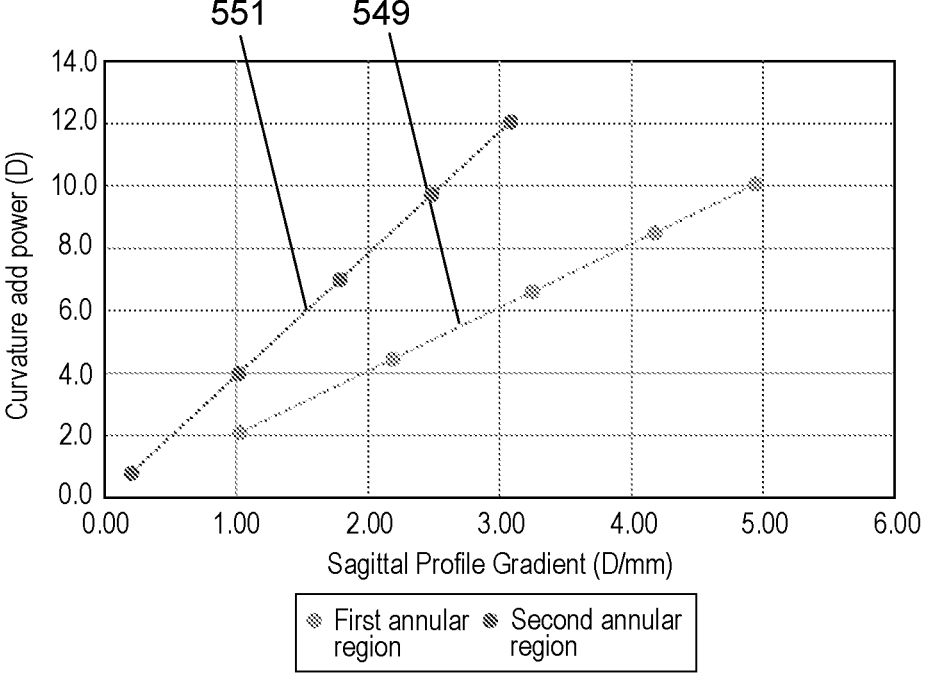
FIG. 13B is a plot showing variation in sagittal power gradient for annular regions having different curvature add power, and positioned at different radial distances from the centre of a lens.

403 relative to the central region. For each lens, the relative tilt of first annular region relative to the central region is the same. For each lens the sagittal power increases across the width of the first annular region. In between the first annular region and the second annular region, there is a distance region (indicated as region 408) of the lens that has approximately the same power as the central region. For each lens, at the boundary between the distance region and the second annular region, the sagittal power dips again as a result of a tilt of the second annular region relative to the central region and relative to the distance region. For each lens, the radial sagittal power increases across the width of the second annular region. For each lens, the tilt of the second annular region relative to the central region is the same. As the radial curvature add power of the lens increases, the gradient of the radial sagittal power ramp across the first annular region and across the second annular region increases. For example, the gradient of the radial sagittal power ramp for the +10.0 D lens (indicated by curve 445) is greater than the gradient of the radial sagittal power ramp for the +2.0 D lens (indicated by curve 447). FIG. 13B is a plot showing how the gradient of the radial sagittal power ramp varies with radial curvature add power for a first annular region (indicated by curve 549) and the second annular region (indicated by curve 551). The gradient of the radial sagittal power ramp increases with increasing radial curvature add power, and the radial sagittal power gradients across the second annular regions are smaller than the radial sagittal power gradients across the first annular regions.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens, the lens including an optic zone comprising:

a central region, the central region having a centre of curvature that is on an optical axis; and a first annular region, the first annular region having an off-axis centre of curvature that is a first distance from the optical axis, wherein the first annular region has a radial sagittal power profile that increases with increasing radial distance from the optical axis, with a gradient of between about 3.0 D/mm and about 12.0 D/mm, at a point halfway across the radial width of the first annular region, the radial sagittal power equals the average radial sagittal power of the central region, and the radial sagittal power at an inner edge of the first annular region is between 0.5 D and 2.5 D less than the radial sagittal power at an outer edge of the central region.

2. The contact lens according to claim 1, wherein the radial sagittal power profile across the first annular region is linear.

3. The contact lens according to claim 1, wherein the radial sagittal power profile across the first annular region defines a curve having an average gradient of between about 1.0 D/mm and about 20.0 D/mm.

4. The contact lens according to claim 1, wherein the first annular region has a radial sagittal power profile that increases with increasing radial distance from the optical axis, with a gradient of between about 4.0 D/mm and about 12.0 D/mm.

5. The contact lens according to claim 1, wherein the first annular region has a radial sagittal power profile that increases with increasing radial distance from the optical axis, with a gradient of between about 3.0 D/mm and about 6.0 D/mm.

6. A method of manufacturing the contact lens according to claim 1, the method comprising:

forming a contact lens, wherein the lens comprises:

a central region, the central region having a centre of curvature that is on an optical axis; and a first annular region, the first annular region having an off-axis centre of curvature that is a first distance from the optical axis, wherein the first annular region has a radial sagittal power profile that increases with increasing radial distance from the optical axis, with a gradient of between about 3.0 D/mm and about 12.0 D/mm, at a point halfway across the radial width of the first annular region, the radial sagittal power equals the average radial sagittal power of the central region, and the radial sagittal power at an inner edge of the first annular region is between 0.5 D and 2.5 D less than the radial sagittal power at an outer edge of the central region.

7. The contact lens according to claim 1, wherein the radial sagittal power at an outer edge of the first annular region is between 0.5 D and 2.0 D greater than the radial sagittal power at an outer edge of the central region.

8. The contact lens according to claim 1, wherein the first annular region has a curvature providing a radial curvature add power, wherein the radial curvature add power is between +2.0 D and +10.0 D.

9. The contact lens according to claim 1, wherein the central region has a curvature providing the base radial curvature power, wherein the base radial curvature power is between 0.5 and −15.0 D.

10. The contact lens according to claim 1, wherein the first annular region extends radially outwards from a perimeter of the central region by between 0.5 and 1.5 mm.

11. The contact lens according to claim 1, comprising at least one additional annular region that is concentric to the first annular region, each additional annular region having an off-axis centre of curvature that is a first distance from the optical axis, wherein each additional annular region has a sagittal power profile that increases with increasing radial distance from the optical axis, with a gradient of between about 1.0 D/mm and about 20.0 D/mm.

12. The contact lens according to claim 11, wherein each additional annular region has a different radial sagittal power gradient to the first annular region.

13. The contact lens according to claim 11, wherein the radial sagittal power gradient of each additional annular region is dependent upon the radial position of the annular region.

14. A method of reducing progression of myopia, comprising:

providing the contact lens according to claim 1 to a myopic person who is able to accommodate for varying near distances.

15. The contact lens according to claim 11, comprising a plurality of concentric additional annular regions, wherein the additional annular regions are separated by distance regions having the base radial curvature power.

16. The contact lens according to claim 9, wherein the base radial curvature power of the central region results from a curvature of an anterior surface and/or a posterior surface of the lens.

17. The contact lens according to claim 8, wherein the radial curvature power of the first annular region and any additional annular regions results from the curvature of an anterior surface and/or a posterior surface of the lens.

18. The contact lens according to claim 1, wherein the lens comprises an elastomer material, a silicone elastomer material, a hydrogel material, or a silicone hydrogel material, or mixtures thereof.

19. The contact lens according to claim 1, wherein the lens is a molded contact lens.

20. A contact lens, the lens including an optic zone comprising:

a central region, the central region having a centre of curvature that is on an optical axis;

a first annular region, the first annular region having an off-axis centre of curvature that is a first distance from the optical axis, and the first annular region has a radial sagittal power profile that increases with increasing radial distance from the optical axis, with a gradient of between about 1.0 D/mm and about 20.0 D/mm, and at least one additional annular region that is concentric to the first annular region, each additional annular region having an off-axis centre of curvature that is a first distance from the optical axis, wherein each additional annular region has a radial sagittal power profile that increases with increasing radial distance from the optical axis, with a gradient of between about 1.0 D/mm and about 20.0 D/mm, and at a point halfway across the radial width of the first annular region, the radial sagittal power equals the average radial sagittal power of the central region.

* * * * *